(12) United States Patent
Otsuki et al.

(10) Patent No.: US 11,846,868 B2
(45) Date of Patent: Dec. 19, 2023

(54) PROJECTION APPARATUS WITH HEAT DISSIPATION

(71) Applicant: SEIKO EPSON CORPORATION, Tokyo (JP)

(72) Inventors: Nobuyuki Otsuki, Matsumoto (JP); Naoto Takehana, Azumino (JP); Takanori Fukuyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/512,764

(22) Filed: Oct. 28, 2021

(65) Prior Publication Data

US 2022/0137498 A1    May 5, 2022

(30) Foreign Application Priority Data

Oct. 29, 2020   (JP) ................................ 2020-181598

(51) Int. Cl.
*G03B 21/16*    (2006.01)
*G03B 21/28*    (2006.01)
*G03B 21/20*    (2006.01)

(52) U.S. Cl.
CPC ............ *G03B 21/16* (2013.01); *G03B 21/28* (2013.01); *G03B 21/2013* (2013.01)

(58) Field of Classification Search
CPC ...... G03B 21/16; G03B 21/28; G03B 21/145; H04N 9/3144
See application file for complete search history.

(56) References Cited

U.S. PATENT DOCUMENTS

| | | | | |
|---|---|---|---|---|
| 7,156,359 | B2 * | 1/2007 | Dittmer | F16M 11/2071 348/E5.145 |
| 2002/0131023 | A1 * | 9/2002 | Shiraishi | G02F 1/133385 353/57 |
| 2006/0274279 | A1 * | 12/2006 | Yoshii | G03B 21/28 348/E9.027 |
| 2009/0213339 | A1 * | 8/2009 | Huang | G03B 21/16 353/52 |
| 2015/0015851 | A1 * | 1/2015 | Yamada | G02B 7/1815 353/61 |
| 2016/0062075 | A1 * | 3/2016 | Matsuyama | G02B 7/028 353/52 |
| 2018/0033123 | A1 | 2/2018 | Narimatsu et al. | |
| 2021/0247587 | A1 * | 8/2021 | Kayano | G03B 21/142 |

(Continued)

FOREIGN PATENT DOCUMENTS

| | | |
|---|---|---|
| JP | 2008-129507 | 6/2008 |
| JP | 2017-167379 | 9/2017 |
| JP | 2018-021943 | 2/2018 |

*Primary Examiner* — Bao-Luan Q Le
(74) *Attorney, Agent, or Firm* — Dority & Manning, P.A.

(57) ABSTRACT

A projection apparatus (projector) includes a light source apparatus, an image generation unit that generates image light from the light from the light source apparatus, a projection optical system that projects the image light, a reflective optical element (reflection mirror) that forms the projection optical system, deflects back the image light, and causes the deflected image light to exit, a projection optics enclosure that accommodates the projection optical system, and a first opening section formed in the projection optics enclosure so as to open in the position of the reflective optical element (reflection mirror).

13 Claims, 11 Drawing Sheets

(56) References Cited

U.S. PATENT DOCUMENTS

| | | | |
|---|---|---|---|
| 2021/0247672 A1* | 8/2021 | Nagatoshi | G02B 13/16 |
| 2021/0247673 A1* | 8/2021 | Kamigaki | G03B 21/142 |
| 2021/0247683 A1* | 8/2021 | Kamigaki | H04N 5/74 |
| 2021/0247684 A1* | 8/2021 | Kamigaki | G02B 7/04 |
| 2021/0255529 A1* | 8/2021 | Kamigaki | G03B 21/28 |
| 2021/0373299 A1* | 12/2021 | Kayano | G03B 21/28 |
| 2021/0389649 A1* | 12/2021 | Kayano | G02B 13/0065 |
| 2022/0050368 A1* | 2/2022 | Amano | G02B 7/021 |
| 2022/0057705 A1* | 2/2022 | Amano | G02B 13/16 |
| 2022/0091491 A1* | 3/2022 | Kayano | G03B 21/16 |

\* cited by examiner

PROJECTION APPARATUS WITH HEAT DISSIPATION

The present application is based on, and claims priority from JP Application Serial Number 2020-181598, filed Oct. 29, 2020, the disclosure of which is hereby incorporated by reference herein in its entirety

BACKGROUND

1. Technical Field

The present disclosure relates to a projection apparatus.

2. Related Art

There has been a known projection apparatus (projector) including a light source apparatus, an image generation unit that modulates the light from the light source apparatus to generate image light according to image information, and a projection optical system that projects the image light. In a projection apparatus of this type, the projector described in JP-A-2017-167379 discloses a configuration in which a reflective optical element having an aspheric surface is used in the projection optical system to cause the projected light to exit rearward and project an image onto a screen in short-focal-length projection. The projector described in JP-A-2018-021943 discloses a configuration in which two reflective optical elements are used in the projection optical system to change the direction of the projected light so that the projected light exits rearward.

In each projection optical system using a reflective optical element, including those described in JP-A-2017-167379 and JP-A-2018-021943, a large amount of light enters the projection optical system, so that the reflective optical element is particularly likely to be heated. A projection optical system enclosure that holds the reflective optical element is therefore likely to be deformed, and the deformation affects the optical performance of the projection optical system.

SUMMARY

A projection apparatus includes a light source apparatus, an image generation unit that generates image light from light from the light source apparatus, a projection optical system that projects the image light, a reflective optical element that forms the projection optical system, deflects back the image light, and causes the deflected image light to exit, a projection optics enclosure that accommodates the projection optical system, and a first opening section formed in the projection optics enclosure so as to open in a position of the reflective optical element.

DESCRIPTION OF EXEMPLARY EMBODIMENTS

First Embodiment

A projector 1 as a projection apparatus according to the present embodiment will be described.

Figure 1:
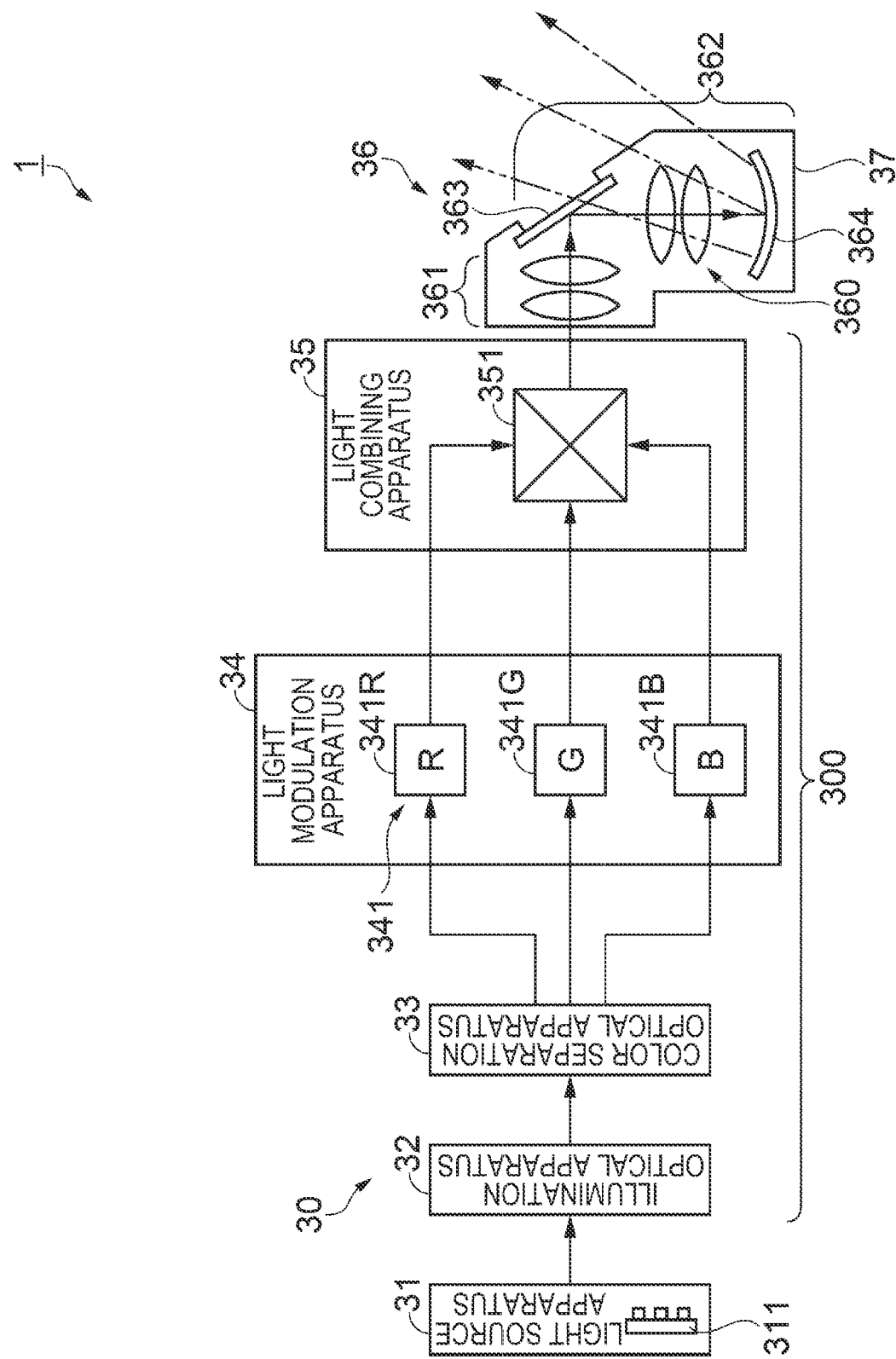
FIG. 1 is a block diagram showing a schematic configuration of the optical system of a projector according to a first embodiment.
Figure 2:
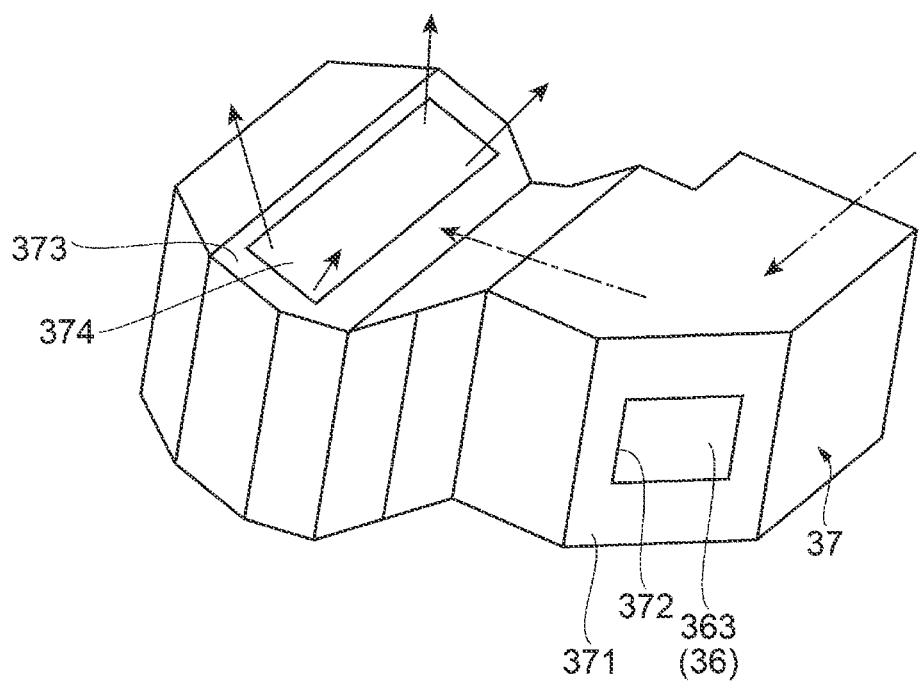
FIG. 2 is a schematic perspective view of the exterior appearance of a projection optical apparatus.
Figure 3:
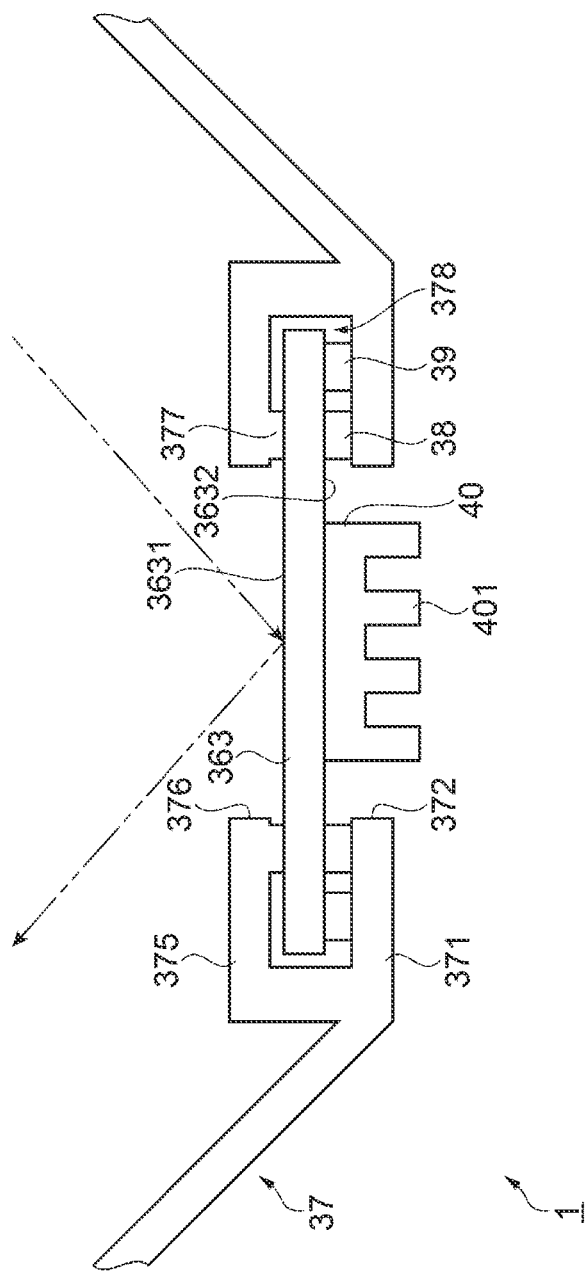
FIG. 3 is a schematic cross-sectional view showing the area of a reflection mirror.
Figure 4:
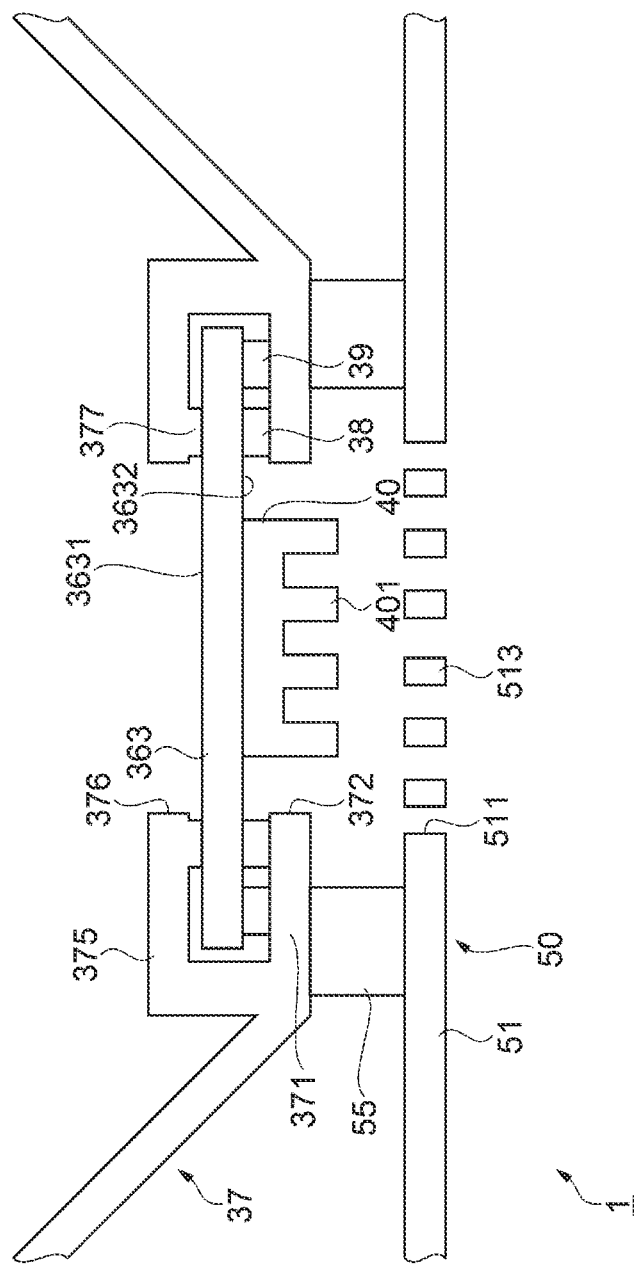
FIG. 4 is a schematic cross-sectional view showing an exterior enclosure.

FIG. 1 is a block diagram showing a schematic configuration of an optical system 30 of the projector 1 according to the present embodiment. FIG. 2 is a schematic perspective view of the exterior appearance of a projection optical apparatus 36. FIG. 3 is a schematic cross-sectional view of a projection optics enclosure 37 taken along the horizontal plane and shows the area of a reflection mirror 363. FIG. 4 is a schematic cross-sectional view showing an exterior enclosure 50 in the area of the reflection mirror 363. In FIG. 2 and the following figures, members are drawn at different scales as appropriate so that the members are shown in recognizable sizes.

The projector 1 as an example of the projection apparatus is an apparatus that modulates a light flux outputted from a light source apparatus 31 in accordance with image information to generate image light and projects the generated image light onto, for example, a screen (not shown), as shown in FIG. 1. The optical system 30 of the projector 1 includes the light source apparatus 31, an illumination optical apparatus 32, a color separation optical apparatus 33, a light modulation apparatus 34, a light combining apparatus 35, the projection optical apparatus 36, and other components. The illumination optical apparatus 32, the color separation optical apparatus 33, the light modulation apparatus 34, and the light combining apparatus 35 on the downstream of the light source apparatus 31 form an image generation unit 300, which generates the image light from the light from the light source apparatus 31.

The light source apparatus 31 is formed, for example, of a laser light source 311, which outputs blue laser light, and the following components: a focusing lens; light emitters; and a collimation lens (none of them is shown). The illumination optical apparatus 32 is formed, for example, of a lens array, a polarization converter, and a superimposing lens (none of them is shown).

The light modulation apparatus 34 is formed, for example, of three transmissive liquid crystal panels 341 provided on a color light basis (red (R) light, green (G) light, and blue (B) light). In detail, the three liquid crystal panels 341 are formed of a liquid crystal panel 341R for R light, which is an example of a light modulator for R light, a liquid crystal panel 341G for G light, which is an example of a light modulator for G light, and a liquid crystal panel 341B for B light, which is an example of a light modulator for B light. The light combining apparatus 35 is formed of a cross dichroic prism 351.

The projection optical apparatus 36 is formed, for example, of a reflection mirror 363 as a reflective optical element in the form of a planar plate and a reflection mirror 364 as a reflective optical element having an aspheric surface in the present embodiment.

The light source apparatus 31 operates as follows: the focusing lens focuses the blue laser light outputted from the light emitters of the laser light source 311 as excitation light; the excitation light is caused to enter the wavelength converter (fluorescent layer); the wavelength converter outputs yellow laser light along with the blue laser light; and the collimation lens collimates the laser light and causes the collimated light to exit toward the illumination optical apparatus 32. The illumination optical apparatus 32 homogenizes the illuminance of the light outputted from the light source apparatus 31 in a plane perpendicular to the illumination optical axis and substantially superimposes the homogenized light on the surface of the light modulation apparatus 34 (liquid crystal panels 341). The color separation optical apparatus 33 separates the illumination light flux outputted from the illumination optical apparatus 32 into three color light fluxes, red (R) light, green (G) light, and blue (B) light, and guides the light fluxes to the three corresponding liquid crystal panels 341.

The light modulation apparatus 34, specifically, the liquid crystal panels 341 modulate the color light fluxes incident thereon in accordance with image information (signals) to form optical images. The light combining apparatus 35, specifically, the cross dichroic prism 351 combines the optical images outputted on a color light basis from the light modulation apparatus 34 with one another and outputs the combined optical image as the image light to the projection optical apparatus 36. The projection optical apparatus 36 has, for example, a zoom adjustment function of zooming the image light incident from the light combining apparatus 35 and projects the enlarged image light onto the screen.

The light source apparatus 31 does not necessarily have the configuration using the laser light source 311 (semiconductor laser diodes), and LEDs (light emitting diodes) or a discharge-type light source lamp can also be used. The light modulation apparatus 34 is not limited to the transmissive liquid crystal panels 341, and reflective liquid crystal panels or micromirror-type devices, for example, digital micromirror devices (DMDs) can be used.

The projection optical apparatus 36 is in detail formed of a projection optical system 360 and the projection optics enclosure 37, which accommodates the projection optical system 360, as shown in FIGS. 1 and 2. The projection optical system 360 is formed of a refractive optical system 361 and a reflective optical system 362.

The refractive optical system 361 is formed of a plurality of lens groups. The lens groups refract the light incident thereon and direct the refracted light toward the reflection mirror 363. The reflection optical system 362 is formed, for example, of the reflection mirror 363 formed of a planar plate and the reflection mirror 364 having an aspherical surface. The reflection mirror 363 formed of a planar plate reflects the light incident from the refractive optical system 361 toward the reflection mirror 364 having an aspheric surface. The reflection mirror 364 having an aspheric surface enlarges the light incident from the reflection mirror 363 formed of a planar plate and reflects the enlarged light obliquely upward and rearward. The light reflected off the reflection mirror 364 passes through a light transmissive plate 374 disposed in the projection optics enclosure 37 and is projected onto the screen or any other object, as shown in FIG. 2. The projector 1 according to the present embodiment is configured as a short-focal-length projector that uses reflective optical elements (reflection mirrors 363 and 364) to deflect back and output the image light.

The projection optics enclosure 37 is formed in a substantially L-letter shape, and a rectangular first opening section 372 is formed at an outer wall section 371 of a corner section where the reflection mirror 363 is disposed, as shown in FIG. 2. The light transmissive plate 374, which transmits the light reflected off the reflection mirror 364, is disposed at an upper surface 373 of a front end portion of the projection optics enclosure 37.

The reflection mirror 363 formed of a planar plate in the present embodiment has a rectangular shape, as shown in FIG. 3. An inner wall section 375 is formed on the inner side of the outer wall section 371 of the corner section of the projection optics enclosure 37, as shown in FIG. 3. A rectangular opening section 376 for reflection is formed in the inner wall section 375 so as to face the first opening section 372. An insertion section 378 surrounded by the outer wall section 371 and the inner wall section 375 is formed, and the reflection mirror 363 is inserted into the insertion section 378.

The reflection mirror 363 is inserted into and disposed in the insertion section 378. In detail, the reflection mirror 363 is disposed in the insertion section 378 with the reflection mirror 363 sandwiched between the outer wall section 371 and the inner wall section 375. At a surface of the inner wall section 375 that is the surface facing the insertion section 378, a protrusion 377, which forms a reference surface with which the reflection mirror 363 is in contact, is formed along the opening of the opening section 376 for reflection. The reflection mirror 363 is so disposed that a reflection surface 3631 is in contact with the protrusion 377. The reflection mirror 363 comes into contact with the protrusion 377 when a rear surface 3632 of the reflection mirror 363 is urged by an urging member 38 disposed on the inner side of the outer wall section 371 (at surface facing insertion section 378). The urging member 38 can, specifically, be a plate spring or a coil spring.

A first seal member 39 is disposed in the space between the rear surface 3632 of the reflection mirror 363, which is the surface urged by the urging member 38, and the inner surface of the outer wall section 371. In other words, a first seal member 39 is disposed between a reflective optical element (reflection mirror 363) and the circumference of the first opening section 372. The first seal member 39 is formed in a rectangular, annular shape along the opening of the rectangular first opening section 372. The first seal member 39, which maintains the sealed state of the projection optics enclosure 37, prevents dust from entering the projection optics enclosure 37 via the first opening section 372. The first seal member 39 can be an elastic, breathable member.

The reflection mirror 363 in the present embodiment is held by the thus configured projection optics enclosure 37. Assuming that an object that holds the reflection mirror 363 is defined as a holder, it can be said that the outer wall section 371 and inner wall section 375 of the projection optics enclosure 37 is substantially a holder that holds the reflection mirror 363 in the present embodiment, and that the holder is an integral holder integrated with the projection optics enclosure 37. The outer wall section 371 and inner wall section 375 as the integral holder hold the reflection mirror 363 and receive the heat of the reflection mirror 363.

When the reflection mirror 363 is disposed between the outer wall section 371 and the inner wall section 375, part of the rear surface 3632 of the reflection mirror 363 is exposed to the external environment via the first opening section 372. A heat sink 40 for heat dissipation with a plurality of fins 401 is disposed at the exposed rear surface 3632 of the reflection mirror 363, and the fins 401 of the heat sink 40 are exposed to the external environment via the first opening section 372. The reflection mirror 363, specifically, the reflection surface 3631 reflects the image light traveling through the interior of the projection optics enclosure 37 and causes the reflected image light to exit via the opening section 376 for reflection, as indicated by the two-dot chain line in FIG. 3.

FIG. 4 shows the area where the reflection mirror 363 is held and which faces the projection optics enclosure 37. The projector 1 according to the present embodiment includes the exterior enclosure 50, which accommodates the light source apparatus 31, the image generation unit 300 (illumination optical apparatus 32, color separation optical apparatus 33, light modulation apparatus 34, and light combining apparatus 35), and the projection optics enclosure 37.

In the following sections, the relationship of the outer wall section 371 and the inner wall section 375, which serve as the integral holder that holds the reflection mirror 363, with the exterior enclosure 50 will be described.

When the projection optics enclosure 37 is accommodated in the exterior enclosure 50, a second opening section 511 formed in a rectangular shape is formed at a side wall section 51 of the exterior enclosure 50, which is a side wall section facing the first opening section 372 of the integral holder (outer wall section 371 and inner wall section 375), which holds the reflection mirror 363, as shown in FIG. 4. The second opening section 511 exposes the first opening section 372. A grid 513 having a plurality of holes or slits are formed at the second opening section 511.

A second seal member 55 is disposed inside the exterior enclosure 50 and around the second opening section 511, as shown in FIG. 4. The second seal member 55 is formed in a rectangular, annular shape along the opening of the rectangular second opening section 511. The second seal member 55, which maintains the sealed states of the exterior enclosure 50 and the projection optics enclosure 37, prevents dust from entering the exterior enclosure 50 via the second opening section 511.

The present embodiment can provide the effects below.

In the projector 1 according to the present embodiment, the projection optics enclosure 37, which accommodates the projection optical system 360 (refractive optical system 361 and reflective optical system 362), has the first opening section 372 formed and opening in the position where the reflection mirror 363 is held.

In the configuration described above, the reflection mirror 363 as a reflective optical element generates heat when reflecting the image light and causing the reflected light to exit, but the heat of the reflection mirror 363 can be dissipated out of the projection optics enclosure 37 via the first opening section 372. Heat-induced deformation of the projection optics enclosure 37, which accommodates the projection optical system 360, is therefore suppressed, so that even when the illumination intensity is high, projection misalignment and other disadvantageous behaviors can be prevented, whereby the optical performance of the projection optical system 360 can be maintained.

The projector 1 according to the present embodiment includes the integral holder (outer wall section 371 and inner wall section 375) integrated with the projection optics enclosure 37, the integral holder holding the reflection mirror 363 and receiving the heat of the reflection mirror 363. The outer wall section 371 of the integral holder exposes part of the rear surface 3632 of the reflection mirror 363 to the environment outside the projection optics enclosure 37 via the first opening section 372.

The configuration described above, in which the rear surface 3632 of the reflection mirror 363 is exposed, allows the heat of the reflection mirror 363 to be dissipated directly to the environment outside the projection optics enclosure 37 via the first opening section 372.

In the projector 1 according to the present embodiment, the heat sink 40 is formed at a portion of the reflection mirror 363 in the integral holder that is the portion exposed to the environment outside the projection optics enclosure 37.

The configuration described above allows the heat sink 40, which dissipates heat, to efficiently cool the reflection mirror 363.

In the projector 1 according to the present embodiment, the integral holder includes the first seal member 39, which is located between the reflection mirror 363 and the circumference of the first opening section 372 and maintains the sealed state of the projection optics enclosure 37.

The configuration described above can prevent dust from entering the projection optics enclosure 37 via the first opening section 372.

The projector 1 according to the present embodiment includes the exterior enclosure 50, which accommodates the light source apparatus 31, the image generation unit 300, and the projection optics enclosure 37, and the exterior enclosure 50 includes the second opening section 511, which exposes the first opening section 372.

The configuration described above can further suppress the heat generated by the reflection mirror 363, whereby the deformation of the projection optics enclosure 37 due to the heat is further suppressed.

In the projector 1 according to the present embodiment, the exterior enclosure 50 includes the second opening section 511, and the second seal member 55, which maintains the sealed state between the exterior enclosure 50 and the projection optics enclosure 37, is provided inside the exterior enclosure 50 and around the second opening section 511.

Providing the second seal member 55 as described above can prevent dust from entering the exterior enclosure 50.

Second Embodiment

Figure 5:
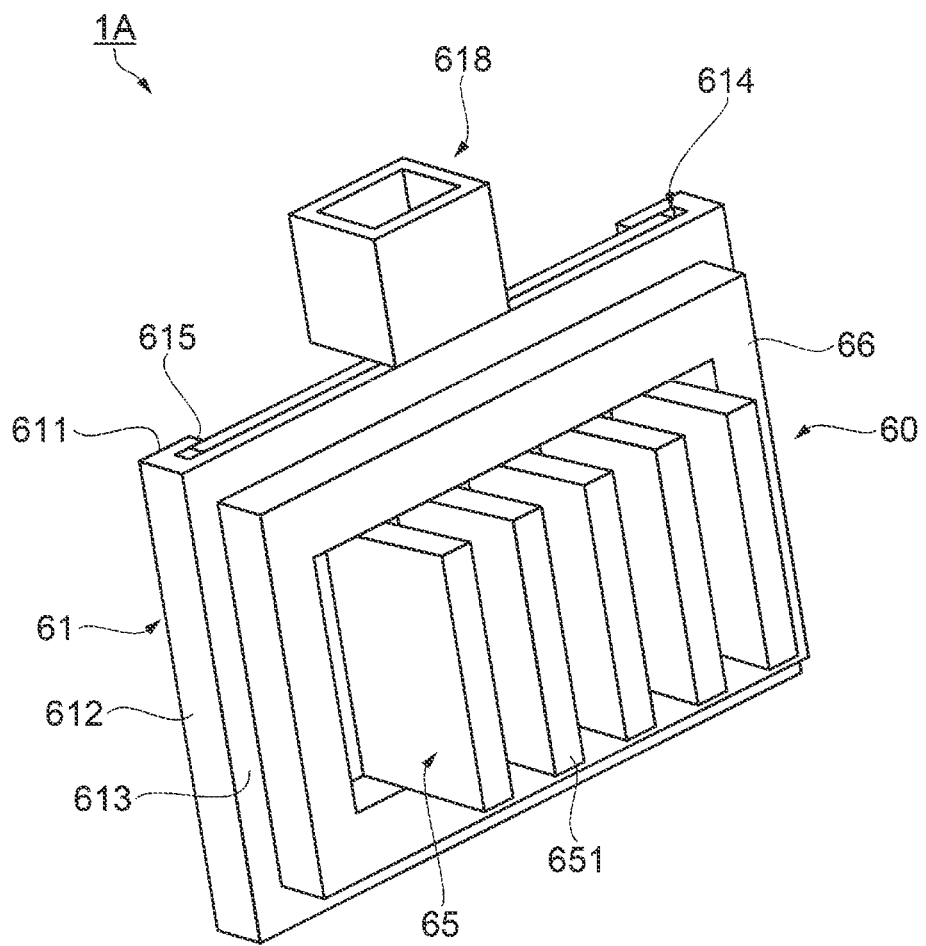
FIG. 5 is a schematic perspective view of a reflection mirror holding separate holder according to a second embodiment.
Figure 6:
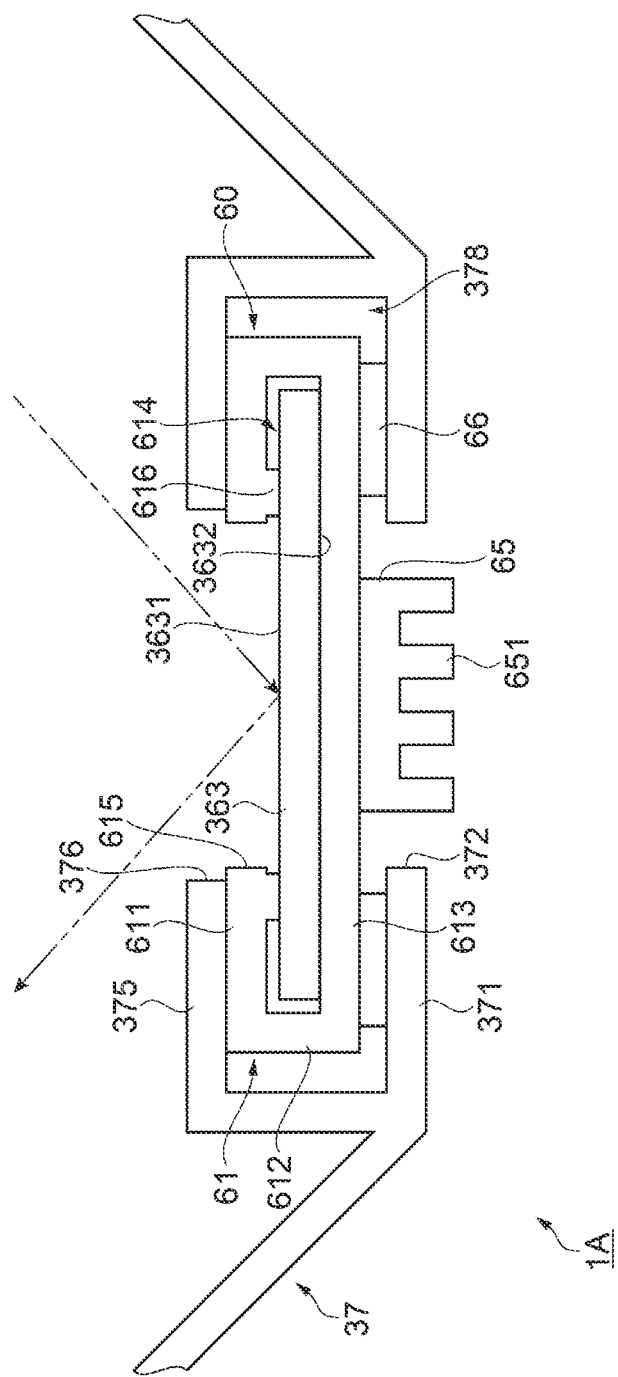
FIG. 6 is a schematic cross-sectional view showing the state in which the separate holder is disposed in a projection optics enclosure.
Figure 7:
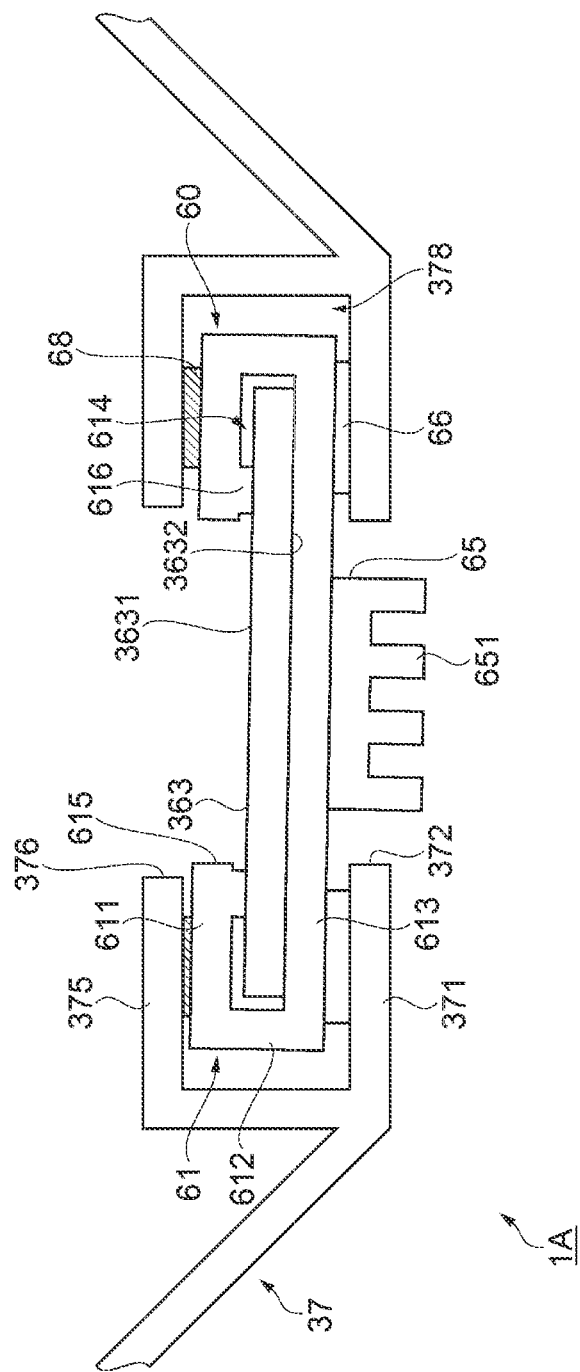
FIG. 7 is a schematic cross-sectional view showing the state in which the separate holder with the angle of the reflection mirror adjusted is disposed in the projection optics enclosure.

FIG. 5 is a schematic perspective view of a separate holder 60 according to the present embodiment, which holds the reflection mirror 363 in a projector 1A according to the present embodiment. FIG. 5 shows the separate holder 60 viewed from the side facing a rear surface section 613. FIG. 6 is a schematic cross-sectional view showing the state in which the separate holder 60, which holds the reflection mirror 363, is disposed in the projection optics enclosure 37. FIG. 7 is a schematic cross-sectional view showing the state in which the separate holder 60 with the angle of the reflection mirror 363 adjusted is disposed in the projection optics enclosure 37.

The separate holder 60 differs from the integral holder in the first embodiment in that the separate holder 60 is separate from the projection optics enclosure 37 and holds the reflection mirror 363, as shown in FIG. 5. The separate holder 60 is disposed as a separate component in the projection optics enclosure 37. The separate holder 60 is formed in a substantially rectangular shape in accordance with the shape of the reflection mirror 363. The separate holder 60 includes a holder body 61, which holds the reflection mirror 363, a heat sink 65, a first seal member 66, and other components.

The holder body 61 has a front surface section 611, a side surface section 612, and the rear surface section 613 and further has an insertion section 614, which is surrounded by the three surface sections and into which the reflection mirror 363 is inserted, as shown in FIGS. 5 and 6. An opening section 615 for reflection for the separate holder 60 is formed in the front surface section 611 and extends upward and downward. A protrusion 616, which forms a reference surface with which the reflection mirror 363 is in contact, is formed at the inner surface of the opening section 615 for reflection that is the surface facing the insertion section 614.

The reflection mirror 363 is inserted from below into the insertion section 614 and so disposed that the reflection surface 3631 is in contact with the protrusion 616. In the present embodiment, the reflection mirror 363 is supported and fixed by the elasticity of the holder body 61 or an engagement portion that is not shown without use of the urging member 38 in the first embodiment.

The heat sink 65 with a plurality of fins 651 is disposed at a central portion of the rear surface section 613 of the holder body 61. The first seal member 66 for the separate holder 60, which is a member similar to the first seal member 39 in the first embodiment, is disposed around the heat sink 65 at the rear surface section 613 of the holder body 61. The first seal member 66 is formed in a rectangular, annular shape.

The thus configured separate holder 60 is inserted into the insertion section 378 surrounded by the outer wall section 371 and inner wall section 375 and disposed in the projection optics enclosure 37, as shown in FIG. 6. When the separate holder 60 is inserted into the insertion section 378, the front surface section 611 and the inner wall section 375 are fixed to each other with an adhesive 68 (not shown in FIG. 6).

When the separate holder 60 is inserted into the insertion section 378 and disposed in the projection optics enclosure 37, the rear surface section 613 as part of the separate holder 60 is exposed via the first opening section 372 to the environment outside the projection optics enclosure 37. The first seal member 66, which maintains the sealed state of the projection optics enclosure 37, is then located between the separate holder 60 and the circumference of the first opening section 372. The first seal member 66, which maintains the sealed state of the projection optics enclosure 37, prevents dust from entering the projection optics enclosure 37 via the first opening section 372.

The heat sink 65 is provided at the rear surface section 613 as a portion of the separate holder 60 that is the portion exposed to the environment outside the projection optics enclosure 37. The heat sink 65 has the plurality of fins 651, which are exposed to the external environment via the first opening section 372. The reflection mirror 363, specifically, the reflection surface 3631 reflects the image light traveling through the interior of the projection optics enclosure 37 and causes the reflected image light to exit via the opening sections 376 and 615 for reflection, as indicated by the two-dot chain line in FIG. 6.

A box-shaped adjustment engagement section 618, which allows adjustment of the angle at which the reflection mirror 363 is disposed, is formed at the holder body 61 above the position where the reflection mirror 363 is held, as shown in FIG. 5. In the present embodiment, when the reflection mirror 363 (separate holder 60) is disposed in the projection optics enclosure 37, and after the separate holder 60 is inserted into the insertion section 378, the angle of the reflection mirror 363 can be so adjusted (changed) that the reflected light exits in a predetermined direction with respect to the direction of the incident light. In the adjustment of the angle at which the reflection mirror 363 is disposed, the angle of the separate holder 60 is adjusted with an adjustment jig (not shown) engaging with the adjustment engagement section 618.

After the angle of the reflection mirror 363 (separate holder 60) is adjusted, the reflection mirror 363 is not parallel to the outer wall section 371 or inner wall section 375 but inclines with respect to the wall sections, as shown in FIG. 7. In this case, an angle gap is formed between the front surface section 611 and the inner wall section 375.

In the present embodiment, in view of the gap described above, the adhesive 68 is applied to the outer surface of the front surface section 611 of the separate holder 60, and the separate holder 60 is fixed to the inner surface of the inner wall section 375 that is the surface facing the insertion section 378. The separate holder 60 is thus fixed to the projection optics enclosure 37. In the present embodiment, a UV-curable adhesive is used as the adhesive 68. The first seal member 66 maintains the sealed state also in response to a change in the angle caused by the adjustment of the angle of the reflection mirror 363 (separate holder 60).

The present embodiment can provide the effects below.

Also in the projector 1A according to the present embodiment, in which the projection optics enclosure 37 is provided with the first opening section 372, when the reflection mirror 363 is held in the separate holder 60, the heat of the reflection mirror 363 can be dissipated out of the projection optics enclosure 37 via the first opening section 372.

The projector 1A according to the present embodiment includes the separate holder 60, which is disposed as a separate component in the projection optics enclosure 37, the separate holder 60 holding the reflection mirror 363 and receiving the heat of the reflection mirror 363. Part of the rear surface section 613 of the separate holder 60 is exposed to the environment outside the projection optics enclosure 37 via the first opening section 372.

The configuration described above, in which part of the rear surface section 613 of the separate holder 60 is exposed, allows the heat of the reflection mirror 363 to be dissipated directly to the environment outside the projection optics enclosure 37 via the first opening section 372.

In the projector 1A according to the present embodiment, the heat sink 65 is provided at part of the rear surface section 613 of the separate holder 60 that is the surface exposed to the environment outside the projection optics enclosure 37.

The configuration described above allows the heat sink 65, which dissipates heat, to efficiently cool the reflection mirror 363.

In the projector 1A according to the present embodiment, the separate holder 60 includes the first seal member 66, which is located between the separate holder 60 and the circumference of the first opening section 372 and maintains the sealed state of the projection optics enclosure 37.

The configuration described above can prevent dust from entering the projection optics enclosure 37 via the first opening section 372.

In the projector 1A according to the present embodiment, when the separate holder 60 is disposed so as to incline with respect to the projection optics enclosure 37 to change the angle of the reflected light, the first seal member 66 for the separate holder 60 maintains the sealed state.

The configuration described above can prevent dust from entering the projection optics enclosure 37 via the first opening section 372 also when the angle of the reflection mirror 363 is adjusted by using the separate holder 60.

3. Third Embodiment

Figure 8:
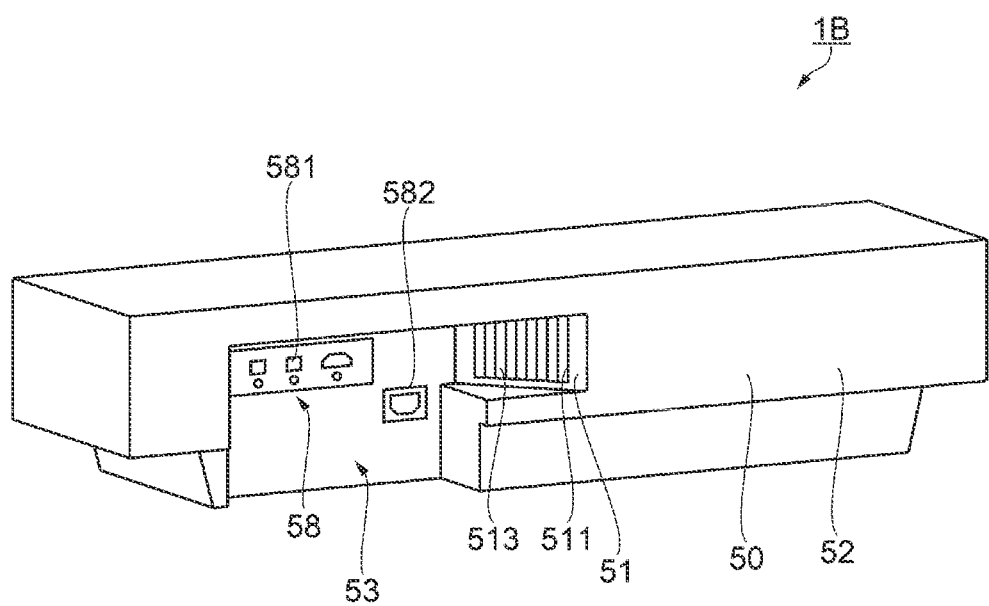
FIG. 8 is a schematic perspective view showing the exterior appearance of the projector according to a third embodiment.

FIG. 8 is a schematic perspective view showing the exterior appearance of a projector 1B according to the present embodiment. FIG. 8 shows the exterior enclosure 50 viewed from the side facing the rear surface section 52.

In the projector 1B according to the present embodiment, the reflection mirror 363 and the projection optics enclosure 37 having the configurations shown in FIG. 4 in the first embodiment are accommodated in the exterior enclosure 50. The second opening section 511 and the plurality of holes or slits of the grid 513 are formed at the side wall section 51 of the exterior enclosure 50, as shown in FIG. 4. The side wall section 51 of the exterior enclosure 50 is formed so as to incline inward from the rear surface section 52.

In the present embodiment, the exterior enclosure 50 has a recess 53 recessed inward from the rear surface section 52. The recess 53 and the side wall section 51 are formed so as to be continuous with each other, as shown in FIG. 8. In other words, the recess 53 is provided continuously with the second opening section 511.

An interface 58 is disposed at the recess 53, and the interface 58 has a plurality of input terminals 581, via which an image signal and other signals from a plurality of external electronic instruments (not shown) are inputted. An electric power supply inlet connector 582 connected to a power cable (not shown) and other components are also disposed at the recess 53.

The present embodiment can provide the effects below.

In the projector 1B according to the present embodiment, the exterior enclosure 50 has the recess 53 provided with the interface 58. The recess 53 is provided continuously with the second opening section 511.

The configuration described above, in which the interface 58 is provided at the recess 53 and the recess 53 is provided continuously with the second opening section 511, allows the recess 53, which is recessed inward from the rear surface section 52, gaps at the interface 58, and other portions to be used for the cooling even when an obstacle or any other object that obstructs ventilation is present near the rear surface section 52 of the projector 1B. Furthermore, the second opening section 511 can be made not noticeable in the exterior appearance and can have a simplified design, as the interface 58 is.

4. Fourth Embodiment

Figure 9:
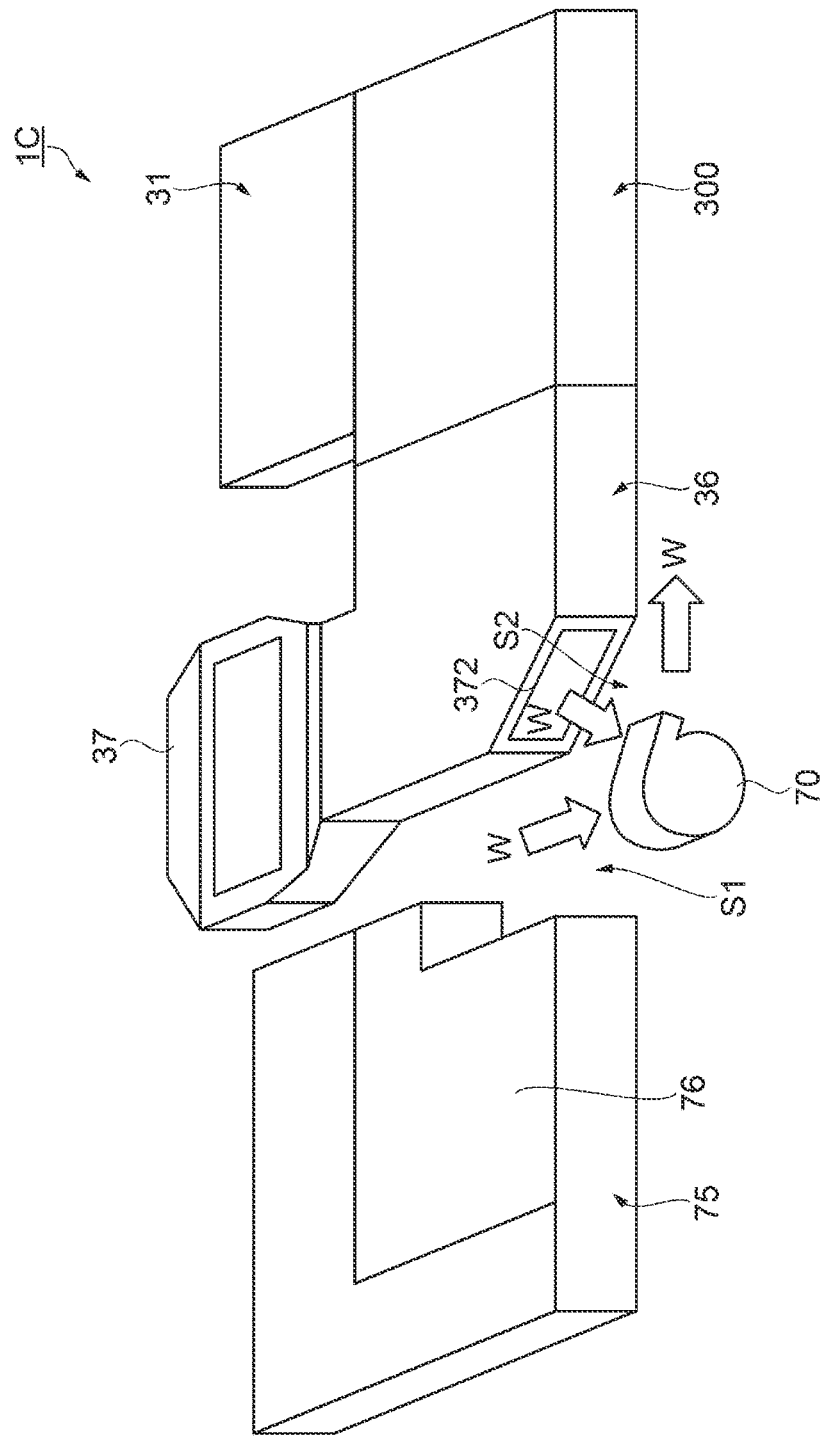
FIG. 9 is a schematic perspective view showing the interior of the projector according to a fourth embodiment.
Figure 10:
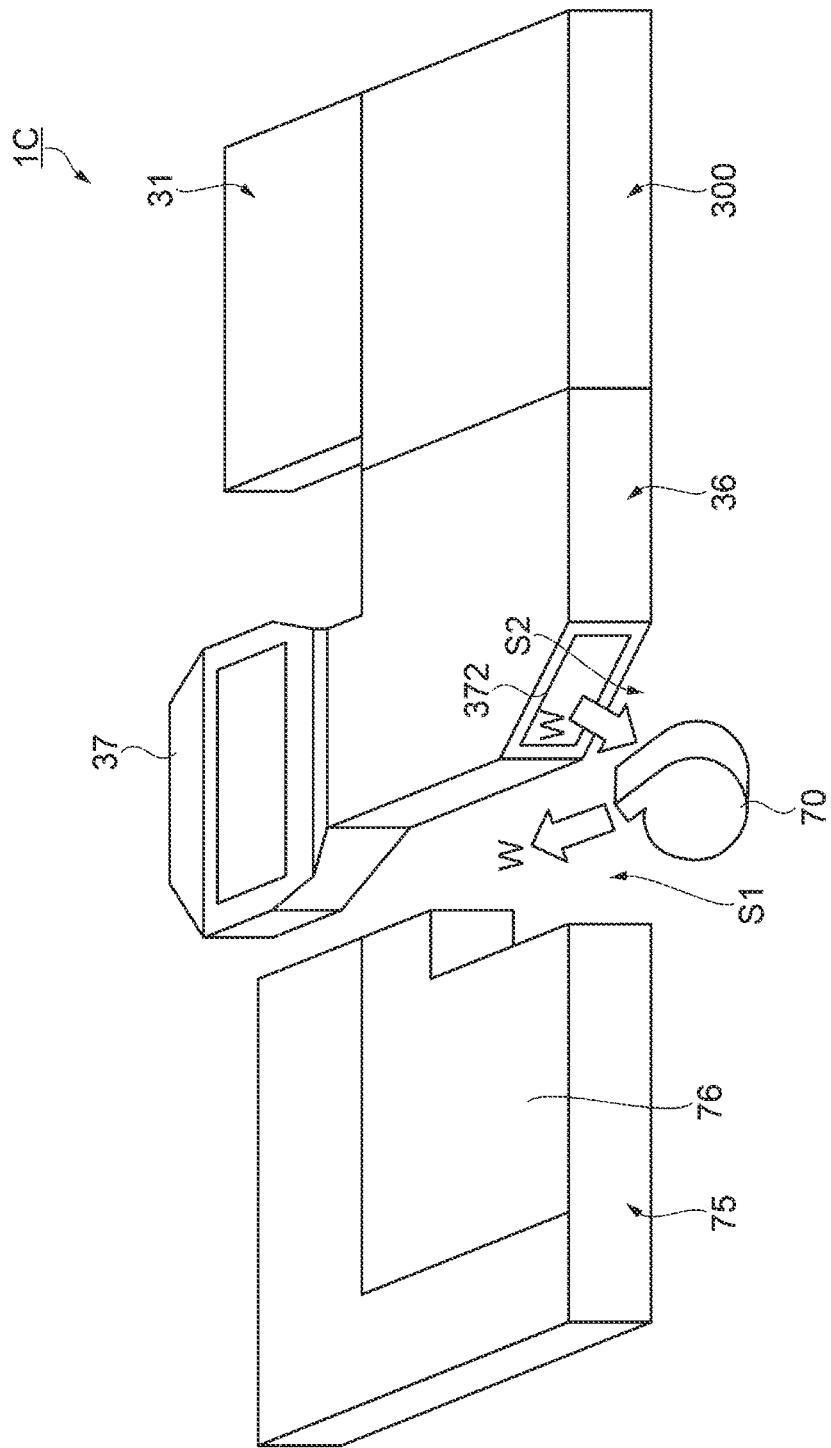
FIG. 10 is a schematic perspective view showing the interior of the projector.

FIGS. 9 and 10 are schematic perspective views showing the interior of a projector 1C according to the present embodiment. FIGS. 9 and 10 do not show the exterior enclosure of the projector 1C.

In the interior of the projector 1C (inside exterior enclosure that is not shown), the light source apparatus 31 and the image generation unit 300, which form the optical system 30, are located on the right side in the plane of view, as shown in FIGS. 9 and 10. The projection optical apparatus 36 (projection optics enclosure 37), which forms the optical system 30 and is connected to the image generation unit 300, is disposed at the center. A controller 75 including a control circuit substrate 76, which controls the operation of the projector 1C, is disposed in a position adjacent to and on the left of the projection optical system 360. The exterior enclosure, which is not shown, of the projector 1C, accommodates the projection optics enclosure 37, the image generation unit 300, the light source apparatus 31, and the controller 75.

The arrangement in the exterior enclosure of the projector 1C according to the present embodiment allows the structure of the projector 1C to have a small length in the depth direction. Therefore, the projection optical apparatus 36 is disposed in the central position, the image generation unit 300 and the light source apparatus 31 are disposed on one side (right side), and the controller 75, which controls the operation of the projector 1C, and other components are disposed on the other side (left side).

A cooling fan 70 is provided in the exterior enclosure. In the exterior enclosure, the cooling fan 70 communicates with a first space S1, where the control circuit substrate 76 is disposed, and a second space S2, which the first opening section 372 of the projection optics enclosure 37 faces, and causes cooling air W to flow in the first space S1 and the second space S2.

In the present embodiment, the cooling fan 70 is what is called a sirocco fan, which has a structure in which air sucked in the direction of the axis of rotation of the fan is discharged in the direction of the centrifugal force produced by the rotation. The cooling fan 70 is not limited to a sirocco fan and can instead be what is called an axial flow fan, which has a structure in which air sucked in the direction of the axis of rotation of the fan is discharged in the same direction.

In FIG. 9, the cooling fan 70 is disposed so as to be substantially sandwiched among the first space S1, the second space S2, and the exterior enclosure. The cooling fan 70 causes the cooling air W to flow by sucking the atmospheric air from the first space S1 and the second space S2 and discharging the sucked air into the space between the exterior enclosure and the image generation unit 300. In the present embodiment, a duct (not shown) is disposed on the air discharging side of the cooling fan 70, and the cooling air W discharged from the cooling fan 70 flows in the duct along the image generation unit 300, which is located on the light incident side of the projection optical apparatus 36, and is exhausted out of the exterior enclosure via an exhaust port (not shown) formed at the side surface of the exterior enclosure. In this case, the first space S1 (control circuit substrate 76) and the second space S2 (reflection mirror 363) are cooled by the air sucking operation performed by the cooling fan 70.

In the present embodiment, the entire cooling air W discharged from the cooling fan 70 is exhausted via the exhaust port to the external environment. The cooling air W may instead be exhausted to the external environment after part of the discharged cooling air W is caused to flow into the space where the image generation unit 300 (liquid crystal panels 341 of light modulation apparatus 34, for example) and the light source apparatus 31 of the optical system 30 and other components are disposed.

Also in FIG. 10, the cooling fan 70 is disposed so as to be substantially sandwiched among the first space S1, the second space S2, and the exterior enclosure. The cooling fan 70 causes the cooling air W to flow by sucking the atmospheric air from the second space S2 and discharging the sucked air into the first space S1. In this case, the second space S2 (reflection mirror 363) is cooled by the air sucking operation performed by the cooling fan 70, and the first space S1 (control circuit substrate 76) is cooled by the air discharging operation performed by the cooling fan 70. Instead, a duct (not shown) may be disposed, and the cooling air W discharged by the cooling fan 70 may be exhausted out of the exterior enclosure, for example, via an exhaust port (not shown) formed at the front surface of the exterior enclosure.

The present embodiment can provide the effects below.

The projector 1C according to the present embodiment includes the exterior enclosure that accommodates the projection optics enclosure 37, the image generation unit 300, and the light source apparatus 31 and further includes the control circuit substrate 76, which is disposed in the exterior enclosure in a position adjacent to the projection optical system 360. The projector 1C further includes the cooling fan 70, which communicates in the exterior enclosure with the first space S1, where the control circuit substrate 76 is disposed, and the second space S2, which the first opening section 372 of the projection optics enclosure 37 faces, and causes the cooling air W to flow in the first space S1 and the second space S2.

According to the configuration described above, using the cooling fan 70, which sucks the atmospheric air in the first space S1 and the second space S2 and discharges the sucked atmospheric air to forcibly create an air flow instead of cooling based on natural convection, allows improvement in the cooling effect on the control circuit substrate 76 in the first space S1, the reflection mirror 363 in the second space S2, and other components.

5. Fifth Embodiment

Figure 11:
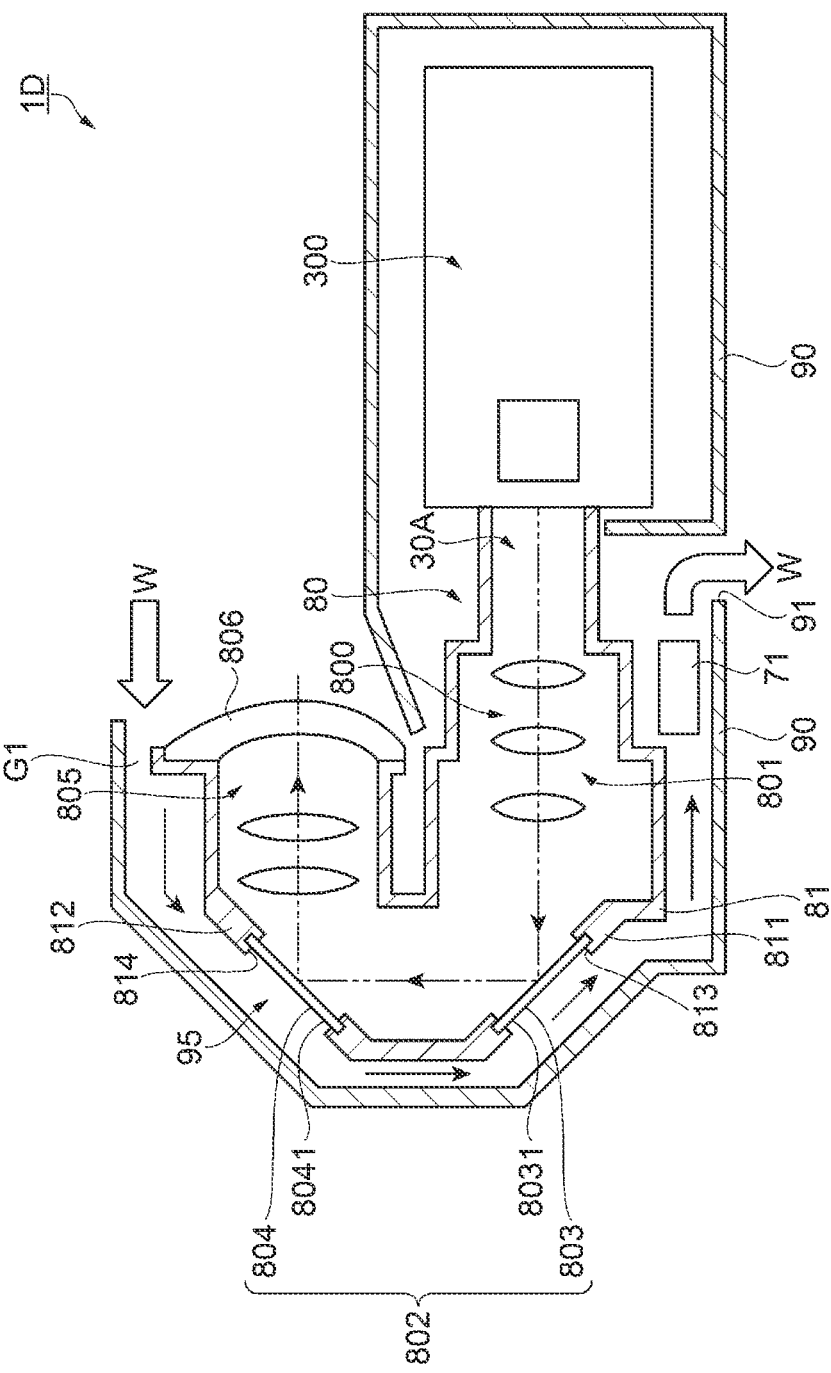
FIG. 11 is a schematic cross-sectional view showing the interior of the projector according to a fifth embodiment.

FIG. 11 is a schematic cross-sectional view showing the interior of a projector 1D according to the present embodiment.

The projector 1D according to the present embodiment includes a projection optical apparatus 80 different from the projection optical apparatus in the first embodiment.

A projection optical system 800 is formed of a relay lens group 801, a reflective optical system 802, and a wide-angle lens system 805. The relay lens group 801 is formed of a plurality of lenses and guides the light incident from the light combining apparatus 35 (FIG. 1) in the image generation unit 300 to the reflective optical system 802.

The reflective optical system 802 includes two reflective optical elements each formed of a planar plate. The two reflective optical elements are formed of a first reflection mirror 803 as a first reflective optical element disposed on the light incident side and a second reflection mirror 804 as a second reflective optical element disposed on the light exiting side. The reflective optical system 802, specifically, the first reflection mirror 803 and the second reflection mirror 804 reflect the light incident thereon to change the direction of the light so that the light is deflected back and guided to the wide-angle lens system 805.

The wide-angle lens system 805 includes a wide-angle lens 806 located at the light exiting side end of the wide-angle lens system 805 and enlarges and projects the light incident via the first reflection mirror 803 and the second reflection mirror 804 by causing the incident light to exit via the wide-angle lens 806.

The projection optical apparatus 80 is formed of the projection optical system 800 described above and a projection optics enclosure 81, which accommodates the projection optical system 800. The projection optics enclosure 81 is formed in a substantially C-letter shape, and rectangular opening sections 813 and 814 are formed at an outer wall section 811 and an outer wall section 812 of corner sections where the first reflection mirror 803 and the second reflection mirror 804 are disposed, as shown in FIG. 11. The opening sections 813 and 814 correspond to the first opening section in the first embodiment (specifically, first opening section 372).

The first reflection mirror 803 and the second reflection mirror 804 are each formed in a rectangular shape and held by the configuration of the integral holder (not shown) in the first embodiment. The first reflection mirror 803 is held on the inner side of the one of the opening sections or the opening section 813, and the second reflection mirror 804 is held on the inner side of the other opening section or the opening section 814. The detailed configuration of the integral holder is omitted in FIG. 11.

A rear surface 8031 of the first reflection mirror 803 is exposed to the environment outside the projection optics enclosure 81 via the opening section 813. Similarly, a rear surface 8041 of the second reflection mirror 804 is exposed to the environment outside the projection optics enclosure 81 via the opening section 814. In FIG. 11, the traveling direction of the image light along the optical axis is conceptually shown by the two-dot chain line.

The projector 1D includes an exterior enclosure 90, which accommodates an optical system 30A, such as the projection optical apparatus 80 and the image generation unit 300, and the controller (not shown). The exterior enclosure 90 is configured to cover the outer surface of the substantially C-letter-shaped projection optics enclosure 81 including the outer side wall sections 811 and 812 from the light exiting side to the light incident side of the projection optical system 800 with a predetermined gap between the exterior enclosure 90 and the projection optics enclosure 81, as shown in FIG. 11. In other words, the projector 1D includes a duct 95, which is provided between the exterior enclosure 90 and the projection optics enclosure 81, which communicates with the light exiting side of the projection optical system 800 to the light incident side of the projection optical system 800 via the first opening section (opening sections 813 and 814) of the projection optics enclosure 81, and through which the cooling air W flows.

An opening section G1 is so formed as to be sandwiched between the light exiting side end of the projection optics enclosure 81 (light exiting side of projection optical system 800), where the wide-angle lens 806 is disposed, and the front end portion of the exterior enclosure 90, which covers the light exiting side end. In other words, it can be said that the opening section G1 is an opening section of the duct 95.

In the present embodiment, a cooling fan 71 (sirocco fan in the present embodiment) is so disposed as to be sandwiched between the inner surface of a bottom portion of the exterior enclosure 90 and an area of the projection optics enclosure 81 that is the area that holds the relay lens group 801. The cooling fan 71 is then driven to suck outside air via the opening G1 into the gap (duct 95) between the exterior enclosure 90 and the projection optics enclosure 81, as shown in FIG. 11. The sucked outside air flows as the cooling air W through the gap (duct 95) between the exterior enclosure 90 and the projection optics enclosure 81 and is discharged from the cooling fan 71. The cooling air W discharged from the cooling fan 71 is exhausted out of the exterior enclosure 90 (projector 1D) via an exhaust port 91. In FIG. 11, the direction of flow of the cooling air W in the present embodiment is diagrammatically shown by solid-line arrows. The flow of the cooling air W cools the second reflection mirror 804 and the first reflection mirror 803 via the opening sections 814 and 813. The cooling air W discharged from the cooling fan 71 may flow through the interior of the exterior enclosure 90 to cool other heat-generating components.

The present embodiment can provide the effects below.

The projector 1D according to the present embodiment includes the exterior enclosure 90, which accommodates the optical system 30A, such as the projection optical apparatus 80 and the image generation unit 300, the controller (not shown), and other components and further includes, between the exterior enclosure 90 and the projection optics enclosure 81, the duct 95, which communicates with the light exiting side of the projection optical system 800 to the light incident side of the projection optical system 800 via the first opening section of the projection optics enclosure 81 (opening sections 814 and 813) and through which the cooling air W flows, and the cooling fan 71, which delivers the cooling air W.

According to the configuration described above, the first reflection mirror 803 and the second reflection mirror 804 can be cooled by the cooling air W flowing through the duct 95.

6. Variation 1

In the projector 1 according to the present embodiment, the heat sink 40 is provided at a portion of the reflection mirror 363 in the integral holder that is the portion exposed to the environment outside the projection optics enclosure 37, but not necessarily. A heat pipe that transfers the heat to the heat sink 40 may be provided at a portion of the reflection mirror 363 in the integral holder that is the portion exposed to the environment outside the projection optics enclosure 37. The configuration described above allows efficient cooling.

7. Variation 2

In the projector 1A according to the second embodiment, the heat sink 65 is provided at the rear surface section 613 as a portion of the separate holder 60 that is the portion is exposed to the environment outside the projection optics enclosure 37, but not necessarily. A heat pipe that transfers the heat to the heat sink 65 may be provided at a portion of the rear surface section 613 of the separate holder 60 that is the portion exposed to the environment outside the projection optics enclosure 37. The configuration described above allows efficient cooling.

8. Variation 3

In the projector 1C according to the fourth embodiment, the cooling fan 70 does not need to be disposed between the first space S1 and the second space S2. Both in the fourth embodiment and Variation 3, the cooling fan 70 only needs to communicate in the exterior enclosure with the first space S1, where the control circuit substrate 76 is disposed, and the second space S2, which the first opening section 372 of the projection optics enclosure 37 faces, and cause the cooling air W to flow in the first space S1 and the second space S2.

9. Variation 4

In the fifth embodiment, the first reflective optical element on the light incident side (first reflection mirror 803) and the second reflective optical element on the light exiting side (second reflection mirror 804) are located at the respective opening sections 813 and 814. In other words, the opening section 813, 814 are formed in correspondence with the first reflection mirror 803 on the light incident side and the second reflection mirror 804 on the light exiting side, but not necessarily. At least the opening section 813 only needs to be formed in correspondence with the first reflection mirror 803 on the light incident side. In general, since the first reflection mirror 803 on the light incident side generates heat by a greater amount than the second reflection mirror 804 on the light exiting side, forming at least the opening section 813 in correspondence with the first reflection mirror 803 on the light incident side allows efficient cooling.

10. Variation 5

In the fifth embodiment, the rear surfaces 8031 and 8041 of the first reflection mirror 803 and the second reflection mirror 804 are exposed via the opening sections 813 and 814, but not necessarily. Heat sinks may be disposed at the rear surfaces 8031 and 8041. The configuration described above can further cool the first reflection mirror 803 and the second reflection mirror 804.

11. Variation 6

In the fifth embodiment, the first reflection mirror 803 and the second reflection mirror 804 are cooled by taking in outside air as the cooling air W via the opening section G1, causing the taken-in air to flow through the gap (duct 95) between the exterior enclosure 90 and the projection optics enclosure 81, and discharging the air from the cooling fan 71, but not necessarily. The first reflection mirror 803 and the second reflection mirror 804 may be cooled by using the air discharged from the cooling fan 71 disposed in the gap as the cooling air W, causing the air to flow in the gap (duct 95) between the exterior enclosure 90 and the projection optics enclosure 81, and exhausting the air out of the projector 1D via the opening section G1.

12. Variation 7

The aforementioned embodiments have been described with reference to the case where the reflection mirrors 363, 803, and 804, which are each a planar plate, are cooled, and the reflection mirrors may each be a concave reflection mirror and is not limited to any particular type.

What is claimed is:
1. A projection apparatus comprising:
   a light source apparatus;
   an image generation unit apparatus that generates image light from light from the light source apparatus;
   a projection optical system that projects the image light;
   a reflective optical element that forms the projection optical system, deflects back the image light, and causes the deflected image light to exit;
   a projection optics enclosure that accommodates the projection optical system; and
   a first opening section formed in the projection optics enclosure so as to open in a position of the reflective optical element;
   a holding element holding the reflective optical element, wherein the holding element exposes a part of the reflective optical element to an environment outside the projection optics enclosure; and
   a heat sink provided to the part of the reflective optical element exposed to the environment outside the projection optics enclosure.

2. The projection apparatus according to claim 1, wherein the reflective optical element includes a first reflective optical element on a light incident side and a second reflective optical element on a light exiting side, and
   at least the first reflective optical element is located at the first opening section.

3. The projection apparatus according to claim 1, further comprising wherein the holding element is an integral holder integrated with the projection optics enclosure, the integral holder holding the reflective optical element and receiving heat of the reflective optical element, wherein the integral holder exposes part of the reflective optical element to the environment outside the projection optics enclosure via the first opening section.

4. The projection apparatus according to claim 3, wherein the integral holder includes a first seal member that is disposed between the reflective optical element and a circumference of the first opening section and maintains a sealed state of the projection optics enclosure.

5. The projection apparatus according to claim 4, further comprising an exterior enclosure that accommodates the projection optics enclosure, the image generation apparatus unit, and the light source apparatus, wherein the exterior enclosure has a second opening section that exposes the first opening section, and
   a second seal member that maintains sealed states of the exterior enclosure and the projection optics enclosure is provided inside the exterior enclosure and around the second opening section.

6. The projection apparatus according to claim 1, further comprising wherein the holding element is a separate holder disposed as a separate component in the projection optics enclosure, the separate holder holding the reflective optical element and receiving heat of the reflective optical element, wherein the separate holder exposes the part of the separate holder to the environment outside the projection optics enclosure via the first opening section.

7. The projection apparatus according to claim 6, wherein the separate holder includes a first seal member that is disposed between the separate holder and a circumference of the first opening section and maintains a sealed state of the projection optics enclosure.

8. The projection apparatus according to claim 7, wherein when the separate holder is disposed so as to incline with respect to the projection optics enclosure to change an angle of light reflected off the reflective optical element, the first seal member for the separate holder maintains the sealed state.

9. The projection apparatus according to claim 1, further comprising an exterior enclosure that accommodates the projection optics enclosure, the image generation apparatus unit, and the light source apparatus, wherein the exterior enclosure has a second opening section that exposes the first opening section, and
   a second seal member that maintains sealed states of the exterior enclosure and the projection optics enclosure is provided inside the exterior enclosure and around the second opening section.

10. The projection apparatus according to claim 9, wherein the exterior enclosure has a recess including an interface, and
    the recess is provided continuously with the second opening section.

11. The projection apparatus according to claim 1, further comprising an exterior enclosure that accommodates the projection optics enclosure, the image generation apparatus unit, and the light source apparatus, wherein the exterior enclosure has a second opening section that exposes the first opening section.

12. The projection apparatus according to claim 1, further comprising an exterior enclosure that accommodates the projection optics enclosure, the image generation apparatus unit, and the light source apparatus;
    a control circuit substrate disposed in the exterior enclosure in a position adjacent to the projection optical system; and
    a cooling fan that communicates in the exterior enclosure with a first space where the control circuit substrate is disposed and a second space that the first opening section of the projection optics enclosure faces and causes cooling air to flow in the first space and the second space.

13. The projection apparatus according to claim 1, further comprising an exterior enclosure that accommodates the projection optics enclosure, the image generation apparatus unit, and the light source apparatus;
    and
    a duct which is disposed between the exterior enclosure and the projection optics enclosure, which communicates with a light exiting side of the projection optical system to a light incident side of the projection optical system via the first opening section of the projection optics enclosure, and through which cooling air flows, and a cooling fan that delivers the cooling air.

* * * * *